(12) United States Patent
Nguyen et al.

(10) Patent No.: US 11,254,178 B1
(45) Date of Patent: Feb. 22, 2022

(54) VEHICLE SUSPENSION STRUT

(71) Applicant: RB Distribution, Inc., Colmar, PA (US)

(72) Inventors: Tam Van Nguyen, Philadelphia, PA (US); Matthew Robert May, Hatboro, PA (US)

(73) Assignee: RB DISTRIBUTION, INC., Colmar, PA (US)

( * ) Notice: Subject to any disclaimer, the term of this patent is extended or adjusted under 35 U.S.C. 154(b) by 0 days.

(21) Appl. No.: 17/361,956

(22) Filed: Jun. 29, 2021

(51) Int. Cl.
   *B60G 15/14* (2006.01)
(52) U.S. Cl.
   CPC .......... *B60G 15/14* (2013.01); *B60G 2202/13* (2013.01); *B60G 2202/152* (2013.01); *B60G 2202/314* (2013.01); *B60G 2204/122* (2013.01); *B60G 2204/1262* (2013.01)
(58) Field of Classification Search
   None
   See application file for complete search history.

(56) References Cited

U.S. PATENT DOCUMENTS

| | | | | | |
|---|---|---|---|---|---|
| 4,683,993 | A | * | 8/1987 | Tanabe | B60G 15/063 188/321.11 |
| 5,690,319 | A | * | 11/1997 | Robinson | B60G 15/14 267/64.19 |
| 9,604,518 | B2 | * | 3/2017 | Reichmann | B60G 15/12 |

FOREIGN PATENT DOCUMENTS

| | | | | | |
|---|---|---|---|---|---|
| DE | 102018210853 | A1 | * | 1/2020 | ............. F16F 9/369 |
| DE | 102018210854 | A1 | * | 1/2020 | ............. F16F 9/369 |
| DE | 102019214905 | A1 | * | 4/2021 | ............. B60G 15/08 |

* cited by examiner

*Primary Examiner* — Faye M Fleming
(74) *Attorney, Agent, or Firm* — Volpe Koenig

(57) ABSTRACT

A suspension strut including an air spring unit and a damper unit that are aligned on a common axis is disclosed. The air spring unit includes a rolling tube having a flared terminal end that extends over a damper tube associated with the damper unit. The damper tube has a circumferential groove formed in an outer diameter of the damper tube. A retaining ring has a greater outer diameter than the outer diameter of the damper tube and is positioned in the circumferential groove. A base has an inner diameter less than the outer diameter of the retaining ring, and an outer diameter smaller than the predetermined diameter of the flared free end, and is supported on the retaining ring. A torsion element fits around the damper tube and within the flared free end.

11 Claims, 5 Drawing Sheets

VEHICLE SUSPENSION STRUT

FIELD OF INVENTION

The present invention relates generally to a vehicle suspension strut. More particularly the invention relates to a vehicle suspension strut that includes an air component. Most particularly, the invention relates to a vehicle suspension strut that has an air spring unit and a damper unit.

BACKGROUND

During use of such a vehicle suspension strut, a relative motion can take place between the air spring unit and the damper unit. This relative motion is generally a rotational motion that take place around the longitudinal axis of the strut assembly as an applied torque. To address this issue, some struts incorporate a torsion element that functions against the torque and repositions the assembly along the longitudinal axis.

Although the air spring unit and a damper unit of the presently available struts are satisfactory initially, it has been discovered that the torsion element become less resilient over time and repositioning the assembly along the longitudinal axis is less reliable. It is believed that this is a result of the breakdown of the torsion element itself or tearing due to vertical loads under changing operating conditions due to road conditions. This has the consequence that air leaks for the strut and the air compressor must continuously supply air to the strut which often results in overheating of the compressor motor.

SUMMARY

The present solution to the prior art problem provides a more robust torsion element with an inner diameter that surround the outer diameter of the damper unit tube and an outer diameter dimeter that complements the inner diameter of the rolling tube associated with the air spring unit. The present torsion element preferably includes a spring which is compressed between the geometries of the damper unit tube and the rolling tube.

BRIEF DESCRIPTION OF THE DRAWINGS

FIG. 4 is a sectional view of the area between the arrows in FIG. 1; and.

DETAILED DESCRIPTION OF THE PREFERRED EMBODIMENTS

Figure 1:
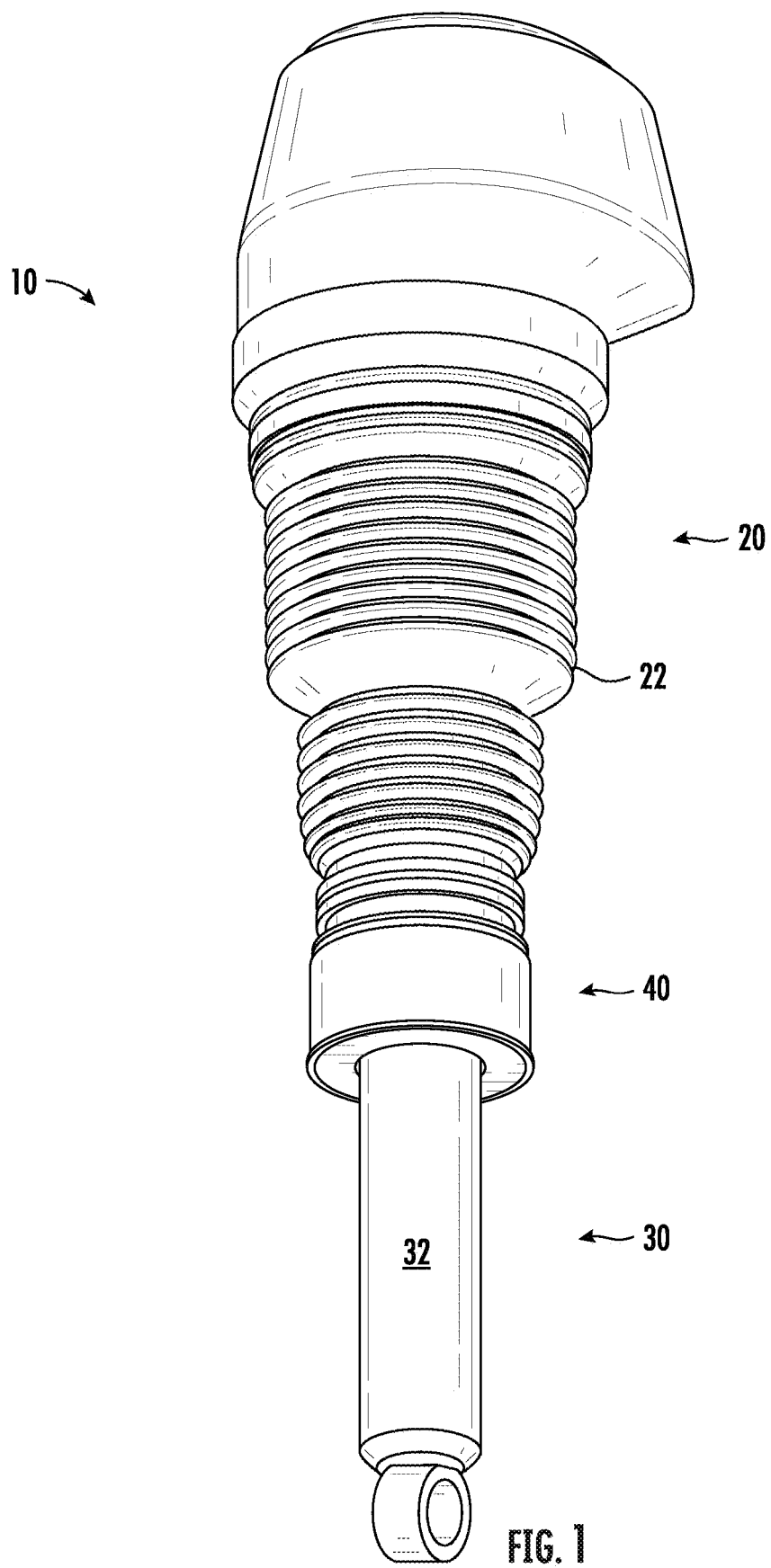
FIG. 1 is a perspective view of suspension strut.

With reference to FIG. 1, suspension strut 10 will be familiar to those of skill in the art as having an air suspension unit 20 and a damper unit 30. the billows 22 extends over a damper tube 32 associated with the damper unit 20. The present invention differs in the area of the housing 40 that includes a torsion element 43 according to the invention.

Figure 2:
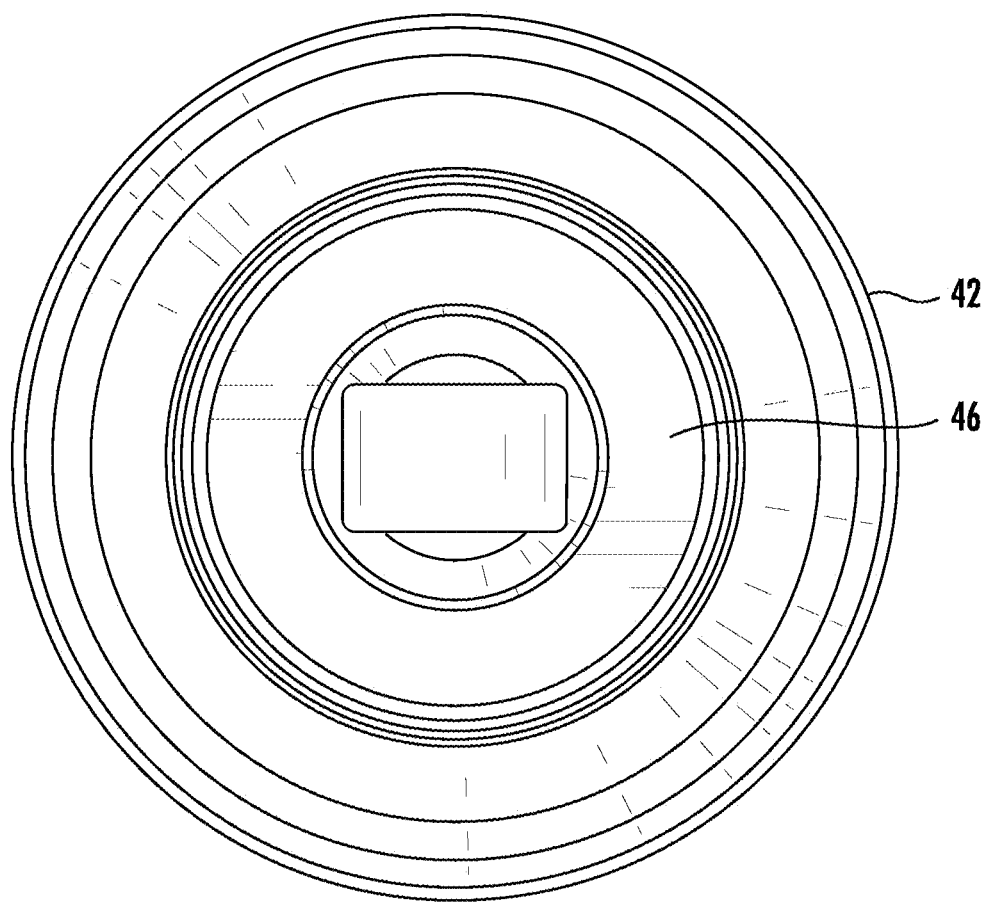
FIG. 2 is a bottom view of the suspension strut in FIG. 1.
Figure 3:
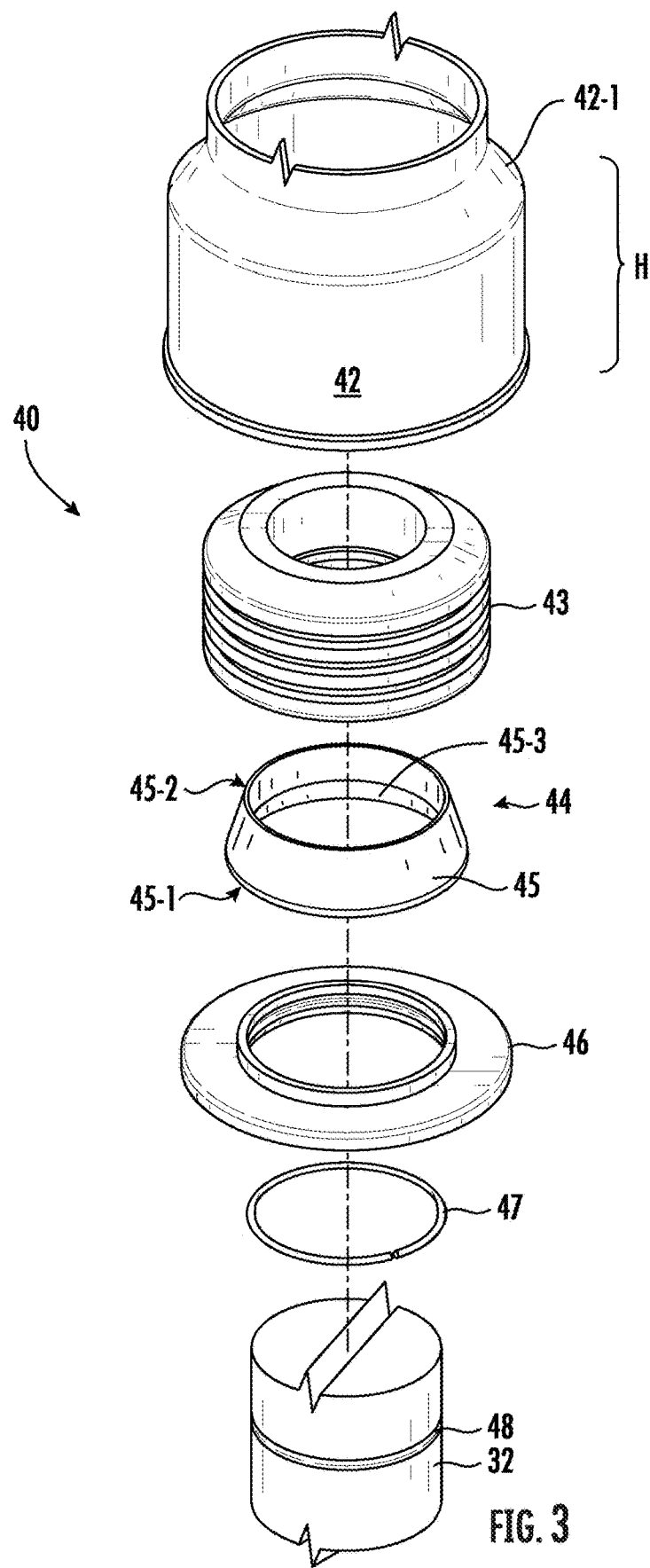
FIG. 3 is an exploded view of the area between the arrows in FIG. 1.
Figure 4:
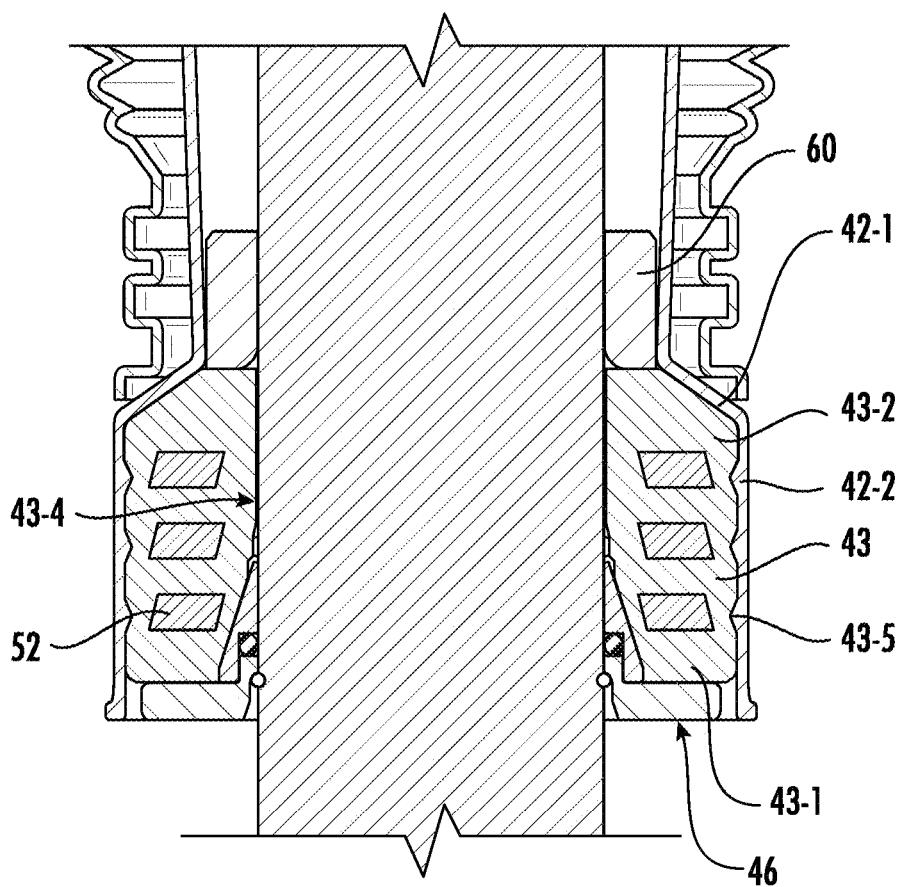

With reference now to FIGS. 2, 3, and 4, the torsion element construction will be described in more detail. With reference to FIG. 2, it can be seen that the combination of the flared housing 40 and torsion element 43 construction according to the invention provides a closed lower end of the rolling tube 42. The housing 40 is flared to form a cylindrical cap 42 with a height H that is selected to define a given volume between the cap 42 and the support member 46, see FIG. 3, so that the torsion element 43 is contained between the cap 42 and the base support 46. In addition to the torsion element 43, a support collar 44 with an inward taper 45 defined by a first diameter 45-1 and second diameter 45-2 rest on the base support 46. The first diameter 45-1 is selected to encircle the damper tube 32 and rest on the support 46 and the second diameter 45-2 is less than the first diameter 45-1 and selected to complement the diameter of the rolling tube 42. The torsion element 43 has an interior taper 43-1 that complements the taper 45, see FIG. 4. The exterior taper 43-2 of torsion element 43 complements the taper 42-1 of the cap 42, see FIG. 4. Thus, the geometry of the torsion element 43 and support components 45 and 46 are configured to complement each other within the cap 42.

Figure 5:
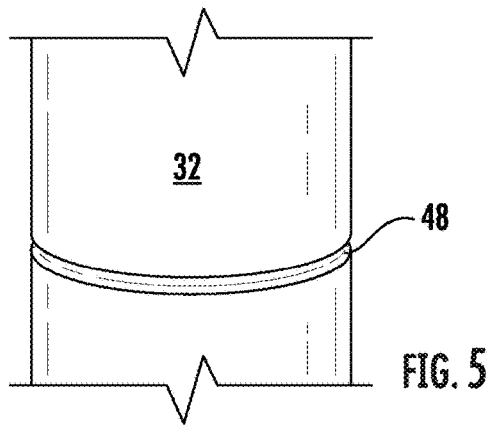
FIGS. 5-10 illustrate the assembly of the area between the arrows in FIG. 1 prior to assembly with the rolling tube of the strut.
Figure 6:
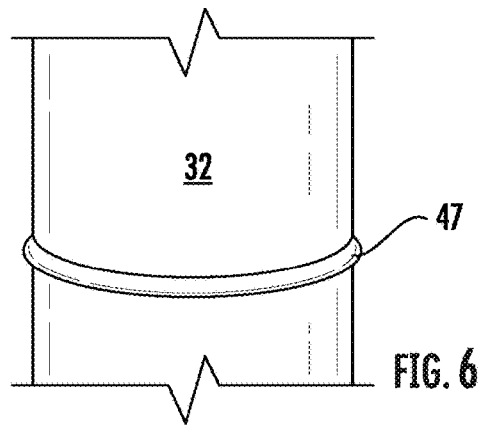
Figure 7:
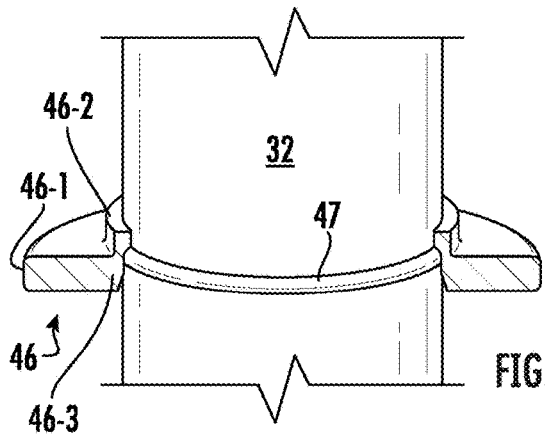
Figure 8:
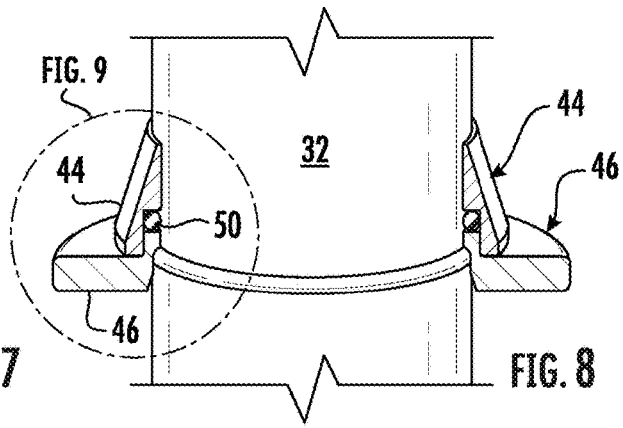
Figure 9:
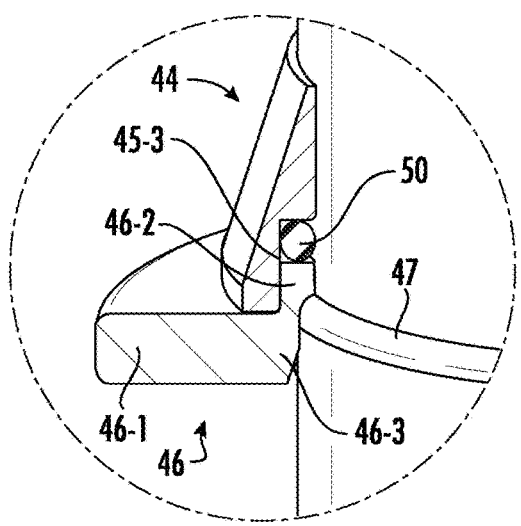
Figure 10:
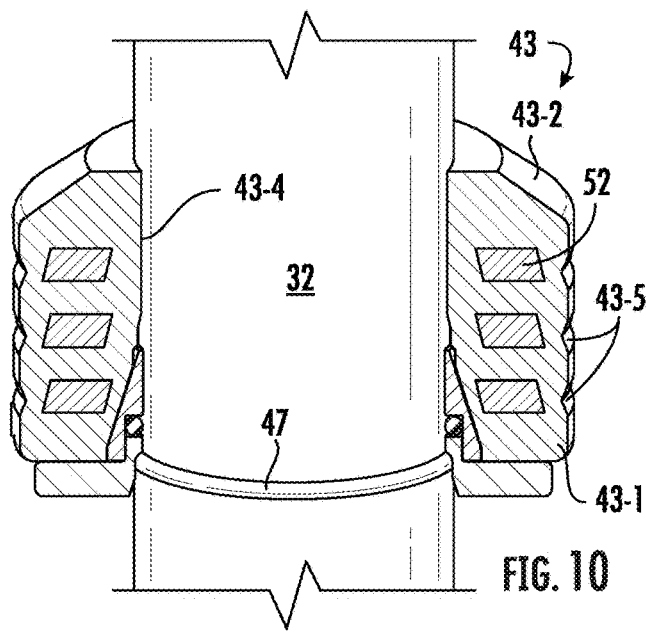

With reference to FIG. 3, an exploded view of the flared housing 40, the construction including the torsion element 43 will be explain in more detail. The conventional damper tube 32 is modified with a grove 48 formed around its outer diameter. A split ring 47 is inserted in the groove 48 to define a stop for the base support 46 which rest on the ring, see FIGS. 5-7. The support collar 44 sits on the base 46 and the torsion element 43 passes over the taper 45 to rest on the base support 46, see FIGS. 4 and 10. The base support 46 is preferably welded to the damper tube 32 after it is position over the split ring 47.

Still with reference to FIGS. 3 and 7-10, it can be seen that the base 46 has a horizontal portion 46-1, a vertical portion 46-2 and a recess 46-3. The vertical portion 46-2 fits within an interior groove 45-3 in the support collar 44. In a preferred embodiment a resilient O ring 50 is located between the base support and the support collar. The torsion element 43 is molded to fit tightly with the given volume between the cap 42 and the support member 46. The torsion element 43 has a series of exterior impressions or indentations 43-5 that are dimensioned to complement a series of projections 42-2 on the interior of the cap 42, and the inner diameter 43-44 complements the exterior diameter of the rolling tube 42, see FIGS. 4 and 10. The sleeve 60 fits tightly between the damper tube 32 and the rolling tube 42 at a position just above the taper 42-1 of the cap 42. The sleeve 60 aides in maintaining the alignment between the damper tube 32 and the rolling tube 42.

This construction of the torsion element provides a more durable seal for the compressed air, that reduce wear on the compressor motor, and better torque transmission with a reduced tilt moment that is believe to increase strut life and road handling for the vehicle. The combination of the base support 46 and torsion element 43 provides a sealed rolling tube 42 to prevent the ingress of dirt and road debris.

In the most preferred embodiment the torsion element 43 is over molded on a coil spring 52. The inclusion of the coil spring is preferred as an additional dampening element. The spring 52 is preferably AISI 6188 chromium-vanadium steel, the support collar 44 is preferably AISI steel, and the torsion element is natural rubber.

What is claimed is:
1. A suspension strut comprising:
an air spring unit and a damper unit that are aligned on a common axis;
the air spring unit defines a first end of the strut and the damper unit defines a second end of the strut;

the air spring unit includes a rolling tube having a flared terminal end with a predetermined diameter that extends over a damper tube associated with the damper unit;

the damper tube has an outer diameter that is less than the predetermined diameter of the rolling tube and a circumferential groove is formed in the outer diameter of the damper tube;

a retaining ring having a greater outer diameter than the outer diameter of the damper tube is positioned in the circumferential groove;

a base having an inner diameter less than the outer diameter of the retaining ring, and an outer diameter that is less than the predetermined diameter of the flared free end of the rolling tube is supported on the retaining ring; and, a torsion element that is dimensioned to fit around the damper tube and within the flared free end of the rolling tube is supported on the base.

2. A suspension strut comprising:

an air spring unit and a damper unit that are aligned on a common axis;

the air spring unit defines a first end of the strut and the damper unit defines a second end of the strut;

the air spring unit includes a rolling tube with an end cap that extends around a portion of a damper tube associated with the damper unit;

the end cap has a predetermined inner diameter, a predetermined outer diameter, and a predetermined height;

the damper tube has an outer diameter that is less than the predetermined inner diameter of the end cap;

a retaining ring with a predetermined outer diameter is located in a circumferential groove formed in the portion of the damper tube;

a base with an inner diameter that is at least equal to the outer diameter of the damper tube and less than the retaining ring outer diameter, and an outer diameter that is no greater than inner diameter of the end cap is supported on the retaining ring; and, a torsion element with has a predetermined height and a predetermined outer diameter is located around the damper tube and is confined between the end cap and the base.

3. The suspension strut of claim 2, wherein a support collar rest on the base and the torsion element extend around the support collar.

4. The suspension strut of claim 2, wherein the torsion element is molded of a resilient material.

5. The suspension strut of claim 2, wherein the torsion element is over-molded around a spring.

6. The suspension strut of claim 2, wherein the torsion element is over-molded around a coiled spring.

7. The suspension strut of claim 2, wherein the damper tube is metallic and the base is welded to the damper tube.

8. The suspension strut of claim 2, wherein a sleeve is positioned between the damper tube and the rolling tube.

9. The suspension strut of claim 2, wherein the rolling tube has an outer diameter that is less than the inner diameter of the end cap and the outer diameter of the end cap tapers toward the rolling tube outer diameter.

10. The suspension strut of claim 9, wherein the torsion element has a taper that complements the end cap taper.

11. A suspension strut comprising:

an air spring unit and a damper unit that are aligned on a common axis;

the air spring unit defines a first end of the strut and the damper unit defines a second end of the strut;

the air spring unit includes a rolling tube with an end cap that extends around a portion of the damper unit;

the end cap has a predetermined inner diameter and a predetermined height;

the damper unit has an outer diameter that is less than the predetermined inner diameter of the end cap;

a base with an inner diameter that is at least equal to the outer diameter of the damper unit and an outer diameter that is no greater than the inner diameter of the end cap is supported on the damper unit; and, a torsion element that is dimensioned to fit around the rolling tube has a predetermined height and a predetermined outer diameter so that it rests on the base and is confined within the end cap.

* * * * *